United States Patent [19]
Yopp

[11] Patent Number: 5,322,321
[45] Date of Patent: Jun. 21, 1994

[54] VEHICLE ACTIVE SUSPENSION SYSTEM

[75] Inventor: Wilford T. Yopp, Canton, Mich.

[73] Assignee: Ford Motor Company, Dearborn, Mich.

[21] Appl. No.: 997,068

[22] Filed: Dec. 28, 1992

[51] Int. Cl.$^5$ .......................................... B60G 17/015
[52] U.S. Cl. ................................. 280/707; 280/711; 280/6.1; 280/6.12
[58] Field of Search ............... 280/707, 702, 714, 711, 280/689, 772, 6.12, 6.1; 267/64.17, 64.19, 64.25, 64.27, 64.28, 122, 123

[56]  References Cited

U.S. PATENT DOCUMENTS

| | | | |
|---|---|---|---|
| 3,376,739 | 4/1968 | Thornton | 73/141 |
| 3,573,884 | 4/1971 | Pollinger | 280/711 |
| 3,736,003 | 5/1973 | Ono | 280/711 |
| 4,198,857 | 4/1980 | Preux | 73/141 |
| 4,245,585 | 1/1981 | Curnutt | 280/711 |
| 4,478,431 | 10/1984 | Muller et al. | 280/710 |
| 4,619,467 | 10/1986 | Lafferty | 280/708 |
| 4,625,994 | 12/1986 | Tanaka et al. | 280/707 |
| 4,651,838 | 3/1987 | Hamilton et al. | 177/209 |
| 4,695,074 | 9/1987 | Kobayashi | 280/707 |
| 4,799,707 | 1/1989 | Buma et al. | 280/711 |
| 4,834,418 | 5/1989 | Buma et al. | 280/707 |
| 4,901,986 | 2/1990 | Smith | 267/140.1 |
| 4,911,617 | 3/1990 | Buma et al. | 417/439 |
| 5,060,959 | 10/1991 | Davis et al. | 280/6.1 |

*Primary Examiner*—Karin L. Tyson
*Attorney, Agent, or Firm*—Roger L. May; Raymond L. Coppiellie

[57] ABSTRACT

An active suspension system (10) includes an electrically powered actuator (16) utilized with a height sensor (18) and a gas spring (24) controlled by a gas supply (26) that pressurizes and vents the gas spring to quickly add or remove a predetermined force as needed in assisting the electrically powered actuator.

5 Claims, 2 Drawing Sheets

VEHICLE ACTIVE SUSPENSION SYSTEM

TECHNICAL FIELD

This invention relates to an active suspension system for a vehicle.

BACKGROUND ART

Active suspension systems have previously been utilized to operate between sprung and unsprung masses of a vehicle instead of the more conventional steel or air (or other gas) spring systems. The previously used air suspension systems incorporate air springs and damping elements for controlling the movement of the sprung vehicle mass by reacting to force inputs through the unsprung mass as the vehicle travels along the roadway.

Active suspension systems for vehicles have more recently been introduced to reduce movement of the sprung vehicle mass by reacting to force inputs from the unsprung mass so as to be capable of adjusting for vehicle turning, crosswinds and road imperfections. Such active suspension systems have previously included an electrically powered actuator and a gas spring that cooperatively provide the support between the sprung and unsprung masses of the vehicle.

DISCLOSURE OF INVENTION

An object of the present invention is to provide an improved active suspension system for a vehicle.

In carrying out the above object, an active suspension system constructed in accordance with the present invention operates between sprung and unsprung masses of a vehicle and includes an electrically powered actuator that extends between the sprung and unsprung masses of the vehicle and is operable to generate a variable force. A height sensor provides a means that generates a signal in response to the height between the sprung and unsprung masses of the vehicle. A gas spring of the system supplies a force that assists the electrically powered actuator in supporting the load between the sprung and unsprung masses of the vehicle. A gas supply of the suspension system pressurizes and vents the gas spring to add a predetermined force thereto or remove a predetermined force therefrom, regardless of the momentary ride height of the vehicle, to assist the electrically powered actuator in locating the sprung mass at a desired height with respect to the roadway.

The gas supply includes: (a) a fill tank for communicating with the gas spring; (b) reservoir means including a low pressure reservoir tank for venting the fill tank and a high pressure reservoir tank for pressurizing the fill tank; (c) compressor means for pressurizing or venting the reservoir means; and (d) valve means for controlling communication between the fill tank and the gas spring, the low pressure tank and the high pressure tank of the reservoir means with the fill tank, the compressor means with the reservoir means, and the compressor means with the gas spring.

In one embodiment, the compressor means includes a low pressure compressor for pressurizing the low pressure tank and a high pressure compressor for pressurizing the high pressure tank from the low pressure tank. In another embodiment, the compressor means includes a single compressor for pressurizing the low pressure tank and for pressurizing the high pressure tank from the low pressure tank.

In both preferred embodiments, the gas supply includes a low pressure sensor that senses the pressure of the low pressure tank to control operation of the compressor means in pressurizing or venting the low pressure tank, and the gas supply also includes a high pressure sensor that senses the pressure of the high pressure tank to control operation of the compressor means in pressurizing or venting the high pressure tank from or to the low pressure tank.

The objects, features and advantages of the present invention are readily apparent from the following detailed description of the best modes for carrying out the invention when taken in connection with the accompanying drawings.

BEST MODE FOR CARRYING OUT THE INVENTION

Figure 1:
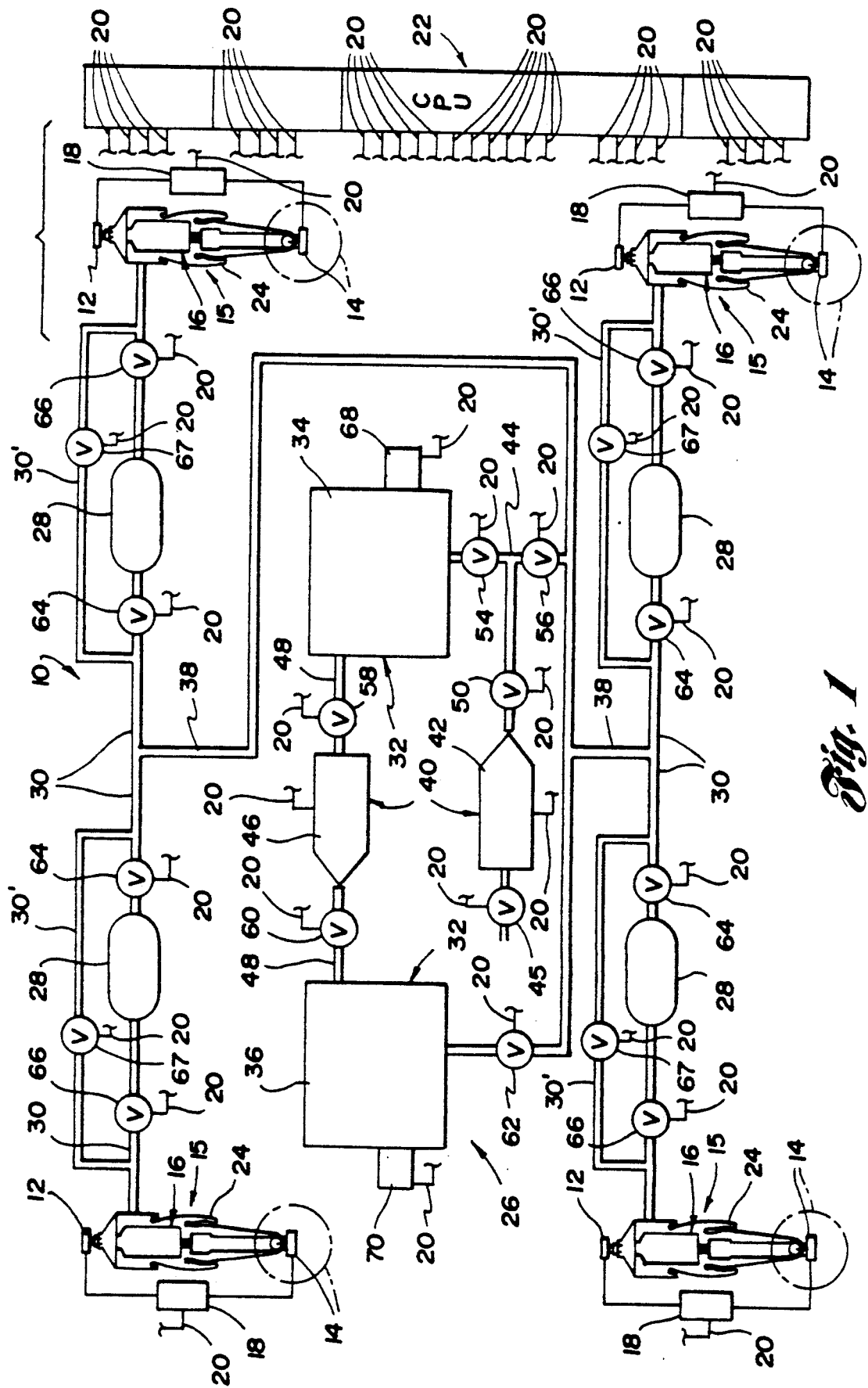
FIG. 1 is a schematic view of one embodiment of an active suspension system for operating between sprung and unsprung masses of a vehicle.

With reference to the FIG. 1, one embodiment of an active suspension system 10 for a vehicle operates between sprung and unsprung masses 12 and 14, respectively, which are embodied by the vehicle body and the vehicle wheels. More specifically, each of the four corners of the sprung vehicle mass 12 is supported by the suspension system above an associated unsprung wheel 14.

At each of the vehicle corners, the active suspension system 10 includes a suspension unit 15 including an electrically powered actuator 16 that extends between the sprung and unsprung masses 12 and 14 of the vehicle and is operable to generate a variable force for supporting the vehicle. This electrically powered actuator may be of any conventional type utilized with active suspension systems such as disclosed by U.S. Pat. No. 5,060,959 Davis et al., assigned to the assignee of the present invention, the entire disclosure of which is hereby incorporated by reference. A height sensor 18 of each suspension unit generates a signal in response to the height between the sprung and unsprung masses 12 and 14 of the vehicle. This height sensor may be a separate unit or may function by sensing the operation of the electrically powered actuator 16, such as by sensing the rotation of the ball screw actuator as disclosed by the 5,060,959 Davis patent. A connector wire 20 connects each sensor 18 with a computer identified as a central processing unit or CPU 22. A gas spring 24 is associated with each electrically powered actuator 16 to supply a force that assists the electrically powered actuator in supporting the load between the sprung and unsprung masses 12 and 14 of the vehicle. A gas supply 26 shown in FIG. 1 pressurizes and vents each gas spring 24 to add a predetermined force thereto or remove a predetermined force therefrom regardless of the momentary ride height of the vehicle. As will be explained more fully below, by knowing the momentary distance between the sprung and unsprung masses of the vehicle, the predetermined force can be added or removed from the gas spring by simply controlling the amount of time that pressurized gas is added or removed from each gas spring through an associated valving means. This provides an advantage in that a pressure sensor typically associated with each gas spring such as disclosed in the '959 patent can be eliminated resulting in the decrease of input/output information handled by a central microprocessor. This leads to utilization of a less sophisticated microprocessor in the suspension system. In this matter, the electrically powered actuator 16 responds in real time to external force inputs acting on the unsprung mass to locate the sprung mass at a desired height with respect to the roadway and each gas spring assists the associated electric actuator much more quickly than in prior art systems so that the electric actuator can reach and be operated at design force in minimal time. As such, the vehicle can be maintained at a desired level condition during turns, uphill travel or downhill travel etc. without requiring any one of the electrically powered actuators 16 to operate greatly above or below the design output force. As is hereinafter more fully described, the addition or removal of the predetermined force can be accomplished rapidly, i.e. in less than a second, and can be repeated a number of times so the electrically powered actuator 16 can operate at a design load to provide best performance.

The gas supply 26 includes a separate fill tank 28 associated with each gas spring 24 for communication therewith through an associated conduit 30. A reservoir means 32 of the gas supply 26 includes a low pressure reservoir tank 34 for venting each fill tank 28 and a high pressure reservoir tank 36 for pressurizing each fill tank through a pair of conduits 38 that respectively supply the conduits 30. A compressor means 40 pressurizes the reservoir means 32 as is hereinafter more fully described. Furthermore, valves provide a means for controlling communication within the system between each fill tank 28 and the associated gas spring 24, the reservoir means 32 and each fill tank 28, the compressor means 40 and the reservoir means 32, and the compressor with each gas spring 24 as is hereinafter more fully described.

The compressor means 40 disclosed in FIG. 1 includes an air dryer and low pressure compressor 42 for pressurizing the low pressure reservoir tank 34 through a T-shaped conduit 44. This low pressure compressor 42 also includes a valve 45 for venting the low pressure tank 34 to the atmosphere. The gas supply 26 also includes a high pressure compressor 46 for pressurizing the high pressure tank 36 from the low pressure tank 34 through a conduit 48.

As previously mentioned, valves control operation between the different components of the system. More specifically, a valve 50 controls communication of the low pressure compressor 42 with the low pressure tank 34 along the stem and one side of the crossbar of the T-shaped conduit 44 which also has valves 54 and 56 along its crossbar for controlling communication between the low pressure tank 34 and the conduit 38 that feeds each of the conduits 30. Furthermore, a valve 58 along the conduit 48 controls communication of the low pressure tank 34 with the high pressure compressor 46 and a valve 60 along this same conduit controls communication of the high pressure compressor 46 with the high pressure tank 36. Valves 58 and 60 also allow reverse flow from the high pressure tank 36 to the low pressure tank 34. Furthermore, a valve 62 controls communication of the high pressure tank 36 with the conduit 38 that feeds each of the conduits 30 along which the fill tanks 28 are located. Along each conduit 30, a valve 64 is located upstream from the associated fill tank 2 to control communication thereof with the low and high pressure reservoir tanks 34 and 36. Along each conduit 30, another valve 66 controls communication between the fill tank 28 and the associated gas spring 24. A branch 30' of each conduit 30 has a valve 67 that allows the compressor means 40 to be communicated with the associated gas spring 24 independently of the associated fill tank 28 for slow speed leveling.

A low pressure sensor 68 of the system senses the pressure of the low pressure reservoir tank 34 to control operation of the low pressure compressor 42 through connections 20 thereof with the CPU 22 in order to pressurize and vent this tank such that it is maintained at a predetermined pressure that is below the normal pressure in the gas spring 24 during use. Furthermore, a high pressure sensor 70 senses the pressure of the high pressure tank 36 to control operation of the high pressure compressor 46 through connections thereof with the CPU 2 in order to pressurize and vent this tank such that it is maintained at a predetermined pressure that is above the normal pressure in the gas spring 24 during use. All of the valves 45, 50, 54, 56, 58, 60, 62, 64, 66 and 67 likewise have connector wires 20 with the CPU 22 to control opening and closing thereof during operation of the system.

During operation of the air suspension system, the low pressure compressor 42 through valves 50 and 54 is operated to maintain a predetermined pressure within the low pressure tank 34 as determined and controlled by sensor 68. Furthermore, the high pressure compressor 46 through the valves 58 and 60 pressurizes the high pressure tank 36 from the low pressure tank 34 and through the operation of sensor 70 provides a predetermined high pressure. Through branch conduits 30' and the associated valves 67, conventional controlling is utilized to provide leveling of the vehicle upon initial vehicle operation and thereafter as necessary to slowly adjust for loading independently of the predetermined force which is added or subtracted by the fill tanks 28 in association with the air supply 26 as described below.

In order to provide an additional amount of force to the gas spring 24, the valve 64 adjacent the associated fill tank 28 is opened with the valve 66 closed and the valve 62 associated with the high pressure tank 36 is opened. Since the fill tank 28 and the high pressure tank 36 each have a known volume, the fill tank 28 is pressurized with air (i.e. any gas) of a known pressure and volume. Thereafter, the valve 64 associated with the particular fill tank 28 involved is closed and the associated valve 66 opens to introduce the gas into the gas spring 24. After pressure equalization, a predetermined force is added to the gas spring between the sprung and unsprung masses 12 and 14 for any given height. The valve 66 is then closed so the associated gas spring 24 can then operate as necessary to assist the electrically powered actuator. It should be noted that the predetermined force can be quickly added to each gas spring 24 in less than about a second, such as in about 250 milliseconds for conduits of about ⅜ inch diameter or as fast as about 100 milliseconds for conduits of about ½ inch diameter. Also, since the low and high pressure reservoirs 34 and 36 vent and pressurize the fill tanks 38 at a known rate, the degree of venting and pressurization can be less than complete while still providing the fill tanks with a known pressure for the given fill tank volume.

In order to provide venting of one of the gas springs 24, the valve 64 of the associated fill tank 28 is opened with the associated valve 66 closed and is communicated through conduits 30 and 38 with the conduit 44 whose valves 54 and 56 are opened so that the fill tank 28 is vented to a predetermined pressure due to its known volume and the known pressure and volume of the low pressure tank 34. Thereafter, the valve 64 is closed and the associated valve 66 is opened so that the pressure within the associated gas spring 24 is vented to the fill tank 28 due to their known volumes and the vent pressure supplied to the fill tank. As such, a predetermined force between the sprung and unsprung masses 12 and 14 of the vehicle is removed from the gas spring 24 for any given height.

During turning operations, a predetermined force can be added to or vented from the gas springs 24 associated with different lateral sides of the vehicle as necessary. In such cases, the pressurization and venting takes place in the same manner described above except for the fact the valves 64 and 66 along the associated conduits 30 will both operate at each lateral side of the vehicle. The low and high pressure tanks 34 and 36 each have a volume (eg. about 1500 in.$^3$) that is about an order of magnitude greater than the volume of each fill tank 28 (eg. about 150 in.$^3$) and each gas spring 24 (eg. about 200 in.$^3$). As such, the low or high pressure tank 34 or 36 can communicate with one as well as two of the fill tanks 28 to supply generally the same fill tank pressure after full or partial pressure equalization.

During uphill and downhill travel, the gas springs 24 associated with the front wheels and the gas springs 24 associated with the rear wheels can likewise be pressurized and vented to add or remove a predetermined force in assisting the electrically powered actuator 16. This is accomplished by pressurizing and/or venting the fill tanks 28 along the conduits 30 associated with the front and rear gas springs.

Best results are achieved during operation of the active suspension system when the predetermined force added or removed from the gas spring 24 is about ½ the steady state stall force of the electrically powered actuator 16. Such operation allows the active suspension system 10 to operate without overcorrecting.

Figure 2:
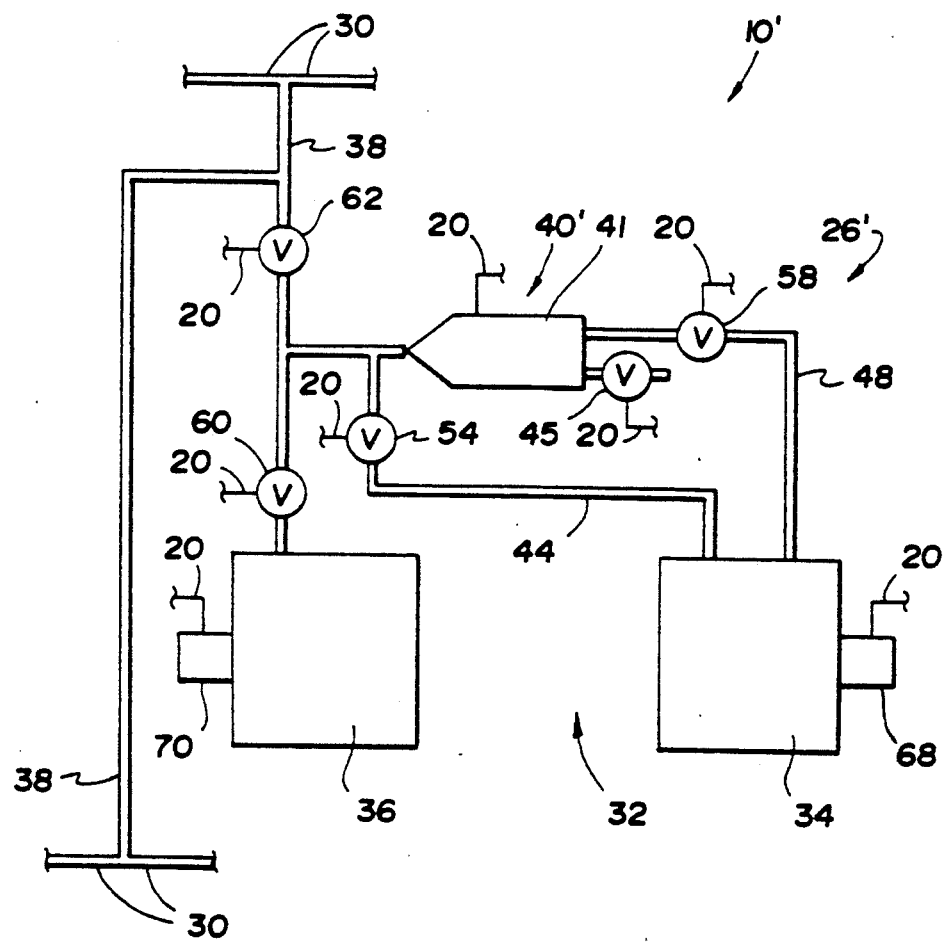
FIG. 2 is a partial schematic view of another embodiment of the active suspension system which is similar to the FIG. 1 embodiment but has only a single compressor instead of low and high pressure compressors.

With reference to FIG. 2, another embodiment of the active suspension system 10' has the same construction as the previously described embodiment except as will be noted and, as such, like reference numerals are applied to like components thereof and the previous description is thus applicable and need not be repeated. Active suspension system 10' has its gas supply 26' provided with a compressor means 40' having a single compressor 41 for pressurizing the low pressure tank 34 and for pressurizing the high pressure tank 36 from the low pressure tank. The previously described valves and conduits are connected so the gas supply 26' can operate to provide the venting or pressurizing of the fill tanks in the same manner previously described.

It should be appreciated that the present invention can be utilized alone or in combination with other active suspension systems such as of the electromagnetic or hydraulic type.

While the best modes for carrying out the invention has been described in detail, alternative modes and embodiments for practicing the invention will be apparent to those skilled in the art as defined by the following claims.

I claim:

1. An active suspension system for operating between sprung and unsprung masses of a vehicle, comprising:

an electrically powered actuator that extends between the sprung and unsprung masses of the vehicle and is operable to generate a variable force;

height sensing means that generates a signal in response to the height between the sprung and unsprung masses of the vehicle;

a gas spring for supplying a force that assists the electrically powered actuator in supporting the load between the sprung and unsprung masses of the vehicle; and a gas supply including a fill tank for communicating with the gas spring, reservoir means including a low pressure reservoir tank and a high pressure reservoir tank for respectively venting and pressurizing the fill tank which is located between the reservoir means and the gas spring such that the venting and filling of the gas spring by the reservoir means is through the fill tank, compressor means for pressurizing the reservoir means, and valve means for controlling communication of: (a) the fill tank with the gas spring, (b) the low pressure tank and the high pressure tank of the reservoir means with the fill tank, and (c) the compressor means with the low pressure tank and the high pressure tank of the reservoir means such that the gas supply pressurizes and vents the gas spring to add a predetermined force thereto or remove a predetermined force therefrom, regardless of the momentary ride height of the vehicle, to assist the electrically powered actuator in locating the sprung mass at a desired height with respect to the roadway.

2. An active suspension system as in claim 1 wherein the compressor means includes a low pressure compressor for pressurizing or venting the low pressure tank and a high pressure compressor for pressurizing the high pressure tank from the low pressure tank.

3. An active suspension system as in claim 1 wherein the compressor means includes a single compressor for pressurizing or venting the low pressure tank and for pressurizing or venting the high pressure tank from the low pressure tank.

4. An active suspension system as in claim 1 wherein the gas supply further including: a low pressure sensor that senses the pressure of the low pressure tank to control operation of the compressor means in pressurizing and venting the low pressure tank, and a high pressure sensor that senses the pressure of the high pressure tank to control operation of the compressor means in pressurizing and venting the high pressure tank from and to the low pressure tank.

5. An active suspension system for operating between sprung and unsprung masses of a vehicle, comprising:

an electrically powered actuator that extends between the sprung and unsprung masses of the vehicle and is operable to generate a variable force;

height sensing means that generates a signal in response to the height between the sprung and unsprung masses of the vehicle;

a gas spring for supplying a force that assists the electrically powered actuator in supporting the load between the sprung and unsprung masses of the vehicle; and a gas supply including a fill tank for communicating with the gas spring, reservoir means including a low pressure reservoir tank and a high pressure reservoir tank for respectively venting and pressurizing the fill tank which is located between the reservoir means and the gas spring such that the venting and filling of the gas spring by the reservoir means is through the fill tank, compressor means for pressurizing the high and low pressure tanks of the reservoir means, and valve means for controlling communication of: (a) the fill tank with the gas spring, (b) the low pressure tank and the high pressure tank of the reservoir means with the fill tank, (c) the compressor means with the low pressure tank and the high pressure tank of the reservoir means to pressurize and vent the gas spring to add a predetermined force thereto or remove a predetermined force therefrom, regardless of the momentary ride height of the vehicle, to assist the electrically powered actuator in locating the sprung mass at a desired height with respect to the roadway, and (d) the compressor means with the gas spring to provide slow speed leveling.

* * * * *